(12) United States Patent
Liu

(10) Patent No.: US 7,653,403 B1
(45) Date of Patent: Jan. 26, 2010

(54) CORDLESS AND WIRELESS FACSIMILE AND METHOD

(76) Inventor: Frank Kung Fu Liu, 23130 Ridge Line, Diamond Bar, CA (US) 91765

( * ) Notice: Subject to any disclaimer, the term of this patent is extended or adjusted under 35 U.S.C. 154(b) by 945 days.

(21) Appl. No.: 10/975,503

(22) Filed: Oct. 28, 2004

Related U.S. Application Data

(60) Provisional application No. 60/515,111, filed on Oct. 28, 2003.

(51) Int. Cl.
*H04B 7/00* (2006.01)

(52) U.S. Cl. .............. 455/500; 455/553.1; 455/556.1; 455/552.1

(58) Field of Classification Search .............. 455/553.1, 455/556.1, 552.1
See application file for complete search history.

(56) References Cited

U.S. PATENT DOCUMENTS

| | | | |
|---|---|---|---|
| 4,881,129 A | 11/1989 | Mitsuhashi | |
| 4,977,609 A | 12/1990 | McClure | |
| 5,041,917 A | 8/1991 | Koshiishi | |
| 5,200,991 A | 4/1993 | Motoyanagi | |
| 5,237,429 A | 8/1993 | Zuiss et al. | |
| 5,519,763 A * | 5/1996 | Namekawa et al. | 455/556.1 |
| 5,537,458 A | 7/1996 | Suomi et al. | |
| 5,608,545 A | 3/1997 | Kagawa | |
| 5,684,608 A | 11/1997 | Charbonnnier et al. | |
| 5,793,843 A | 8/1998 | Morris | |
| 5,864,763 A | 1/1999 | Leung et al. | |
| 5,892,816 A | 4/1999 | Sih et al. | |
| 5,930,727 A | 7/1999 | Henry, Jr. | |
| 5,953,647 A | 9/1999 | Patel et al. | |
| 5,953,675 A * | 9/1999 | Rabina et al. | 455/557 |
| 6,011,968 A | 1/2000 | Patel et al. | |
| 6,035,205 A | 3/2000 | Han | |
| 6,038,037 A | 3/2000 | Leung et al. | |
| 6,157,846 A | 12/2000 | Manning et al. | |
| 6,370,149 B1 * | 4/2002 | Gorman et al. | 370/419 |
| 7,005,963 B1 * | 2/2006 | Scalisi et al. | 340/7.1 |
| 7,024,189 B2 * | 4/2006 | Wonak et al. | 455/426.2 |
| 7,158,249 B2 * | 1/2007 | Watanabe | 358/1.15 |
| 2003/0095524 A1 * | 5/2003 | Stephens et al. | 370/338 |
| 2006/0154678 A1 * | 7/2006 | Maeda | 455/500 |

OTHER PUBLICATIONS

Nabishi Radio and Communications Inntternet web page for PM80 cellular fax machine. (1 page).
Possio PM70 Portable GSM fax machine Internet web page (2 pages).

* cited by examiner

*Primary Examiner*—Patrick N Edouard
*Assistant Examiner*—Shantell Heiber
(74) *Attorney, Agent, or Firm*—Dan Brown Law Office; Daniel R. Brown

(57) ABSTRACT

An apparatus for communicating data, including facsimile data, via first wireless signals and second wireless signals. The apparatus includes a facsimile machine coupled to a switch, a first transceiver that converts the first wireless signals with the switch, and a second transceiver that converts the second wireless signals with the switch. The switch is selectable to a first state wherein the facsimile data is coupled between the first transceiver and the facsimile machine, and a second state wherein the facsimile data is coupled between the second transceiver and the facsimile machine, and a third state wherein the data is coupled between the first transceiver and the second transceiver.

23 Claims, 10 Drawing Sheets

CORDLESS AND WIRELESS FACSIMILE AND METHOD

CROSS REFERENCE TO RELATED APPLICATIONS

This application is the non-provisional of U.S. Ser. No. 60/515,111, filed Oct. 28, 2003, incorporated herein by reference.

BACKGROUND OF THE INVENTION

1. Field of the Invention

The present invention relates to facsimile machines. More specifically, the present invention relates to wireless facsimile machines that operate in wireless telephone networks or with cordless telephone systems.

2. Description of the Related Art

Consumers of modern telephony services have a wide range of products and services available to them. Among these is the conventional wire-line telephone that provides access to the Public Switched Telephone Network ("PSTN"). The classic telephone-set includes a base and a handset. The two are connected together by a cord that carries duplex audio and signaling information. The base is further connected to the PSTN with a twisted pair of wires running from the user's telephone location to a telephone company central office. In addition to providing voice communications, the PSTN widely supports and communicates facsimile image through the use of facsimile machines by consumers. Various technologies for encoding, transmitting, decoding and reproducing facsimile images are known. The dominant standard for communicating facsimile images is the CCITT Group 3 facsimile protocol specification. CCITT Group 3 standards are recognized and have been adopted worldwide, which enables consumers to communicate facsimile images on a worldwide basis. In the United States, the vast majority of facsimile machines are directly connected to the PSTN with twisted pair wires via the familiar RJ-11 jack interface, although cellular telephone network based facsimile machines are known. Many embodiments of facsimile machines are known, including stand-alone machines, personal computer based machines, and integrated peripheral devices, which include a facsimile machine function.

Over the years, many more convenience features have been added to telephone systems and telephone services. Cordless telephones were developed, which eliminated the cord between the base unit and the handset, but did not eliminate the twisted pair of wires connecting the base to the central office. In a cordless telephone, the cord is replaced by a pair or radio transceivers, one in the base and one in the handset, that allow the user to move freely within the radio coverage range of the transceivers. As noted above, cellular telephone networks have also been developed and deployed. Technically speaking, "cellular" is term specifically applied to AMPS based wireless telephones that operate in certain 900 MHz radio bands, as allocated by the FCC. Thus, the term "wireless telephone" will be used hereinafter to describe any telephone system that operates from a radio network, which includes that familiar cellular telephone, as well as GSM, CDMA, TDMA, T-Mobile, Nextel, AMPS, DECT and other systems, which are familiar to those skilled in the art. Wireless telephone networks eliminate the need for interconnection of the telephone terminal unit to the PSTN by a twisted pair of wires. Rather, a network of fixed radio transceivers replaces the wire-line network. Each wireless telephone handset contains a radio transceiver that communicates wirelessly with the wireless network. Wireless telephone networks greatly expand the roaming ability of the users as compared with cordless telephones because the network allows roaming of terminal units between several fixed radio transceivers.

The advent of cordless telephones and wireless telephone service, as well as the dramatic increase in other telephony services, including facsimile communications, has changed the way people use telephones and their expectations about the convenience of service. Most homes and offices have multiple telephone services, including wired telephones, cordless telephones, wireless telephones, as well as facsimile machines. In addition, many users travel frequently and desire to carry their telephony identities with them, and maintain access to the various services that are enjoyed at home or in the office. While there now exists technology to tightly integrate wired, wireless and cordless voice services, in particular, see co-pending U.S. patent application Ser. No. 10/781,105 to Liu, the inventor of the present invention, for WIRELESS NODE MULTIPLE HANDSET CORDLESS TELEPHONE SYSTEM, the contents of which are hereby incorporated herein by reference thereto. However, the facsimile machine has not kept pace with the voice terminal devices, especially in terms of portability and integration between various service types. Essentially, there are fixed location machines that are coupled via twisted pair, and wireless telephone facsimile machines that are essentially terminals on a wireless telephone network. The drawback of the wired machines is the requirement of fixed location service access. The drawback of the wireless telephone terminal is the high cost of operation, dedicated nature of the service function, and the lack of interoperability as to location and interconnection options. Thus, there is a need in the art for an improved apparatus and method of communication wirelessly with facsimile machines across various communications environments, with portability.

SUMMARY OF THE INVENTION

An apparatus for communicating data, including facsimile data, via first wireless signals and second wireless signals is taught. The apparatus includes a facsimile machine coupled to a switch, a first transceiver operable to convert the first wireless signals with the switch, and a second transceiver operable to convert the second wireless signals with the switch. The switch is selectable to a first state wherein the facsimile data is coupled between the first transceiver and the facsimile machine, and a second state wherein the facsimile data is coupled between the second transceiver and the facsimile machine, and a third state wherein the data is coupled between the first transceiver and the second transceiver.

In a specific embodiment of the present invention, the apparatus is further adapted to operate from a rechargeable battery. A portable housing is provided, which encloses the apparatus, and, a rechargeable battery receptacle is formed within the housing for receiving the rechargeable battery. In another embodiment, the first transceiver is a wireless telephone transceiver adapted to communicate according to a wireless telephone network protocol. In a refinement to this embodiment, the apparatus is further adapted to receive a subscriber identity module containing user service profile data. The apparatus includes a subscriber identity module interface that is coupled to the first transceiver for receiving the subscriber interface module and communicating the user service profile data therewith. The switch may be a digital switch of an analog switch.

In a specific embodiment of the present invention, the second transceiver is a cordless telephone transceiver adapted to communicate according to a cordless telephone protocol. In another embodiment, the second transceiver is a cordless telephone transceiver adapted to communicate according to a multiple-handset cordless telephone protocol. In a further refinement of the invention, the apparatus includes a corded handset coupled to the switch, and the switch is selectable to a fourth state wherein the data is coupled between the corded handset and the first transceiver or the second transceiver.

In a particular embodiment of the invention, wherein the first and second wireless signals are communicated through a first and second wireless system, respectively, and the first and second wireless systems require registration of the apparatus, the apparatus further includes a controller coupled to the first transceiver, the second transceiver, and the switch. The controller operates to automatically select a preferred one of the first transceiver or the second transceiver and attempt to register therewith. Upon successful registration therewith, the controller sets the switch to the corresponding one of the three switch states. In a refinement to this embodiment, the apparatus further includes an actuator coupled to the controller. Actuation of the actuator selects the preferred one or the first transceiver of the second transceiver. In another refinement, the controller operates to automatically select the non-preferred one of the first transceiver or the second transceiver in response to a failed registration attempt to register with the preferred one of the first transceiver or the second transceiver. The controller may operate to periodically retry the attempt to register.

The present invention also teaches a method of communicating data, including facsimile data, via first wireless signals and second wireless signals in an apparatus that includes a facsimile machine, a first transceiver and a second transceiver coupled through a switch. The method includes the steps of coupling facsimile data from converted first wireless signals between the first transceiver and the facsimile machine when the switch is set to a first state, and coupling facsimile data from converted second wireless signals between the second transceiver and the facsimile machine when the switch is set to a second state. Also, coupling data from converted first wireless signals and converted second wireless signals between the first transceiver and the second transceiver when the switch is set to a third state.

In a specific embodiment of the foregoing method, the first transceiver is a wireless telephone transceiver, and the method includes the further the step of communicating according to a wireless telephone network protocol. In another embodiment, the method includes the further step of reading user service profile data from a subscriber identity module coupled to the first transceiver. In another embodiment, wherein the second transceiver is a cordless telephone transceiver, the method includes the step of communicating according to a cordless telephone protocol. In another embodiment, wherein the second transceiver is a cordless telephone transceiver, the method includes the step of communicating according to a multiple-handset cordless telephone protocol.

In a specific embodiment of the method, wherein the apparatus further includes a corded handset coupled to the switch, the method includes the further step of coupling data through the switch, between the corded handset and the first transceiver of the second transceiver when the switch is set in a fourth state. In another specific embodiment, wherein the first wireless system and the second wireless system require registration for service, the method further includes the steps of communicating registration signals with a preferred one of the first wireless network or the second wireless network, and upon successful completion of registration, setting the switch to the corresponding one of the three switch states. In a refinement to this method, the further step of selecting the preferred one of the first transceiver or the second transceiver is added. Inn another refinement, the method includes the further step of selecting the non-preferred one of the first transceiver or the second transceiver in response to a failed registration attempt to register with the preferred one of the first transceiver or the second transceiver. Inn yet another refinement, the step of periodically retrying the communicating registration signals step is added.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
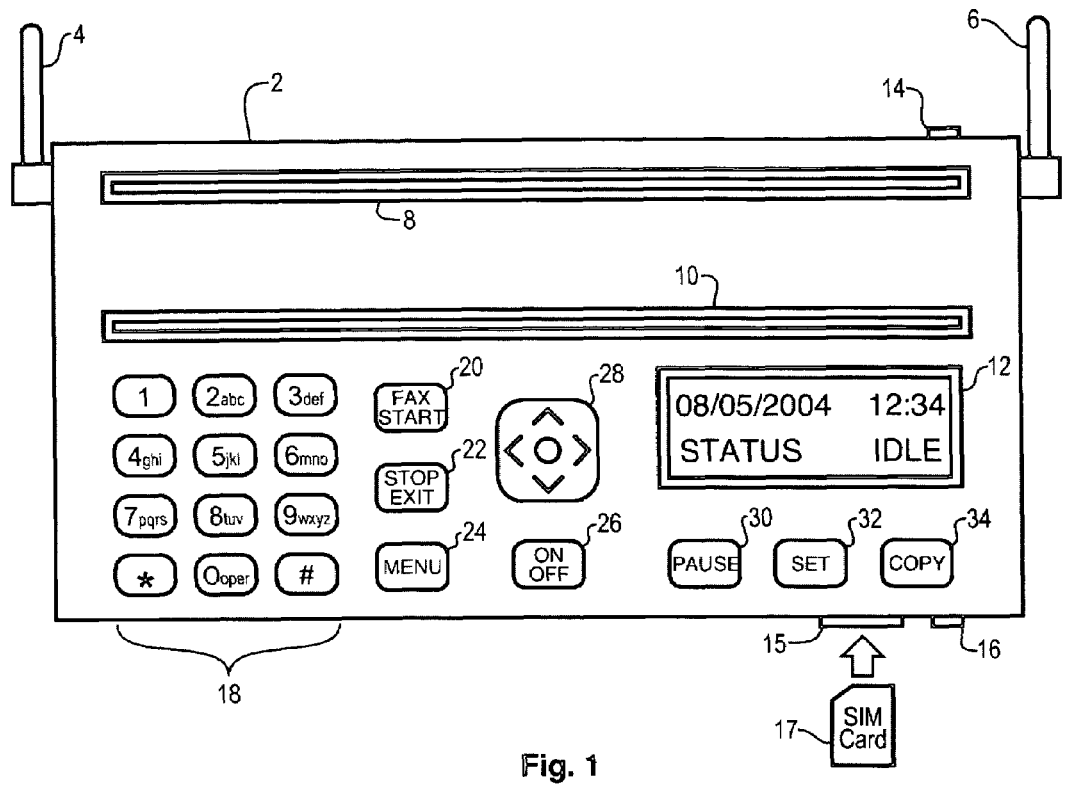
FIG. 1 is a drawing of a cordless and wireless facsimile apparatus according to an illustrative embodiment of the present invention.

Reference is directed to FIG. 1, which is a drawing of a cordless and wireless facsimile apparatus according to an illustrative embodiment of the present invention. The apparatus is capable of communicating voice and facsimile data over either a wireless telephone network, or a cordless telephone system. In addition, the apparatus is capable of automatically registering on either system, based on a user preference. Single and multiple handset cordless systems are supported, and, the apparatus can act as a host to a cordless system when the primary telephony resource is a wireless telephone network. In host mode, voice and facsimile services are fully supported. A compact enclosure 2 is provided, which enables portability while traveling, yet still allows sufficient space for user-friendly controls and full-sized paper handling, such as US letter paper or A4 DIN sized paper. A wireless telephone antenna 4 and a cordless telephone antenna 6 are present on the exterior of the enclosure 2. The antennas 4,6 are flexible and can be oriented to optimized radio performance. In an alternative embodiment, both antenna elements are enclosed in a single ray dome. In another alternative embodiment, the antennas 4,6 are disposed within the housing 2, which yields a very clean appearance. A scanner paper feed slot 8 is present on the top of the housing 2 near the rear, and provides a location for the user to insert documents that are to be scanned and transmitted by facsimile. Note that in an alternative embodiment, a multiple sheet paper feeder may be provided for the convenience of sending multiple pages in a single operation. A received document paper output slot 10 is also present in the top of the enclosure, which is where received documents are output from the apparatus. A sharp edge is provided along one or both sides of the slot 10, to enable the user to cleanly tear pages from a roll of paper (not shown) disposed inside of the housing 2.

The housing 2 in FIG. 1 presents the user interface for access and operation of the apparatus by a user. A conventional telephone-style keypad 18 is provided for entering telephone numbers, programming alphanumeric characters, and operating various functions of the apparatus. A liquid crystal display 12 is provided, which presents the current status of the apparatus, as well as date, time, telephone number, and function menu information. Such menu displays are understood by those skilled in the art. Also, other display technologies, such as LED or plasma displays, may be employed, as are understood by those skilled in the art. A multiple-position rocker switch 28 is provided to enable the user to navigate through a function menu display in the apparatus. An on/off switch 26 is provided for powering the apparatus on and off. Several dedicated function keys are provided in the user interface, to provide convenient access to frequently functions. A FAX/START key 20 enable the scanning and transmission of a document to a predetermined telephone number. A STOP/EXT key 22 terminates any operation in progress, including facsimile reception and transmission. A MENU key 24 causes the user interface to enter the aforementioned menu mode for access and control of various machine functions. A PAUSE key 30 is used to temporarily pause various functions, without terminating the operation completely. A SET key 32 is provided for selecting from a menu of choices in the various function menus. A COPY key 34 is provided, which enables a stand alone copy mode, where documents can be scanned and printed locally, without facsimile transmission.

The housing 2 in FIG. 1 also presents an AC power adapter connector 14, which allows the user to draw current from a wall-plug transformer-adapter when such power is available. In addition to powering the apparatus, the connector 14 allows the user to recharge internal storage batteries (not shown). An external RJ-type connector 16 is provided, which enables the connection of a local corded telephone handset to the apparatus. The corded handset (not shown) enables the user to conduct voice communications with the apparatus. The illustrative embodiment of FIG. 1 includes utilization of industry standard subscriber identity modules ("SIM"). A SIM is a postage-stamp sized integrated circuit device that includes random access memory. The SIM card 17 is basically a tiny computing device that accesses stored data and computer functions. Within the SIM card 17 is stored a user's unique identity and various parameters of personal information. Also includes, is personal data, such as a telephone book list of names and numbers, etc. The SIM cards are portable and enable each user to transfer their identity from one telephone device to another. The SIM card 17 is inserted into a compatible receptacle 15 disposed on the front of the housing 2, which enables any given user to transfer their identity and personal information. SIM card technology is known to those skilled in the art.

Figure 2:
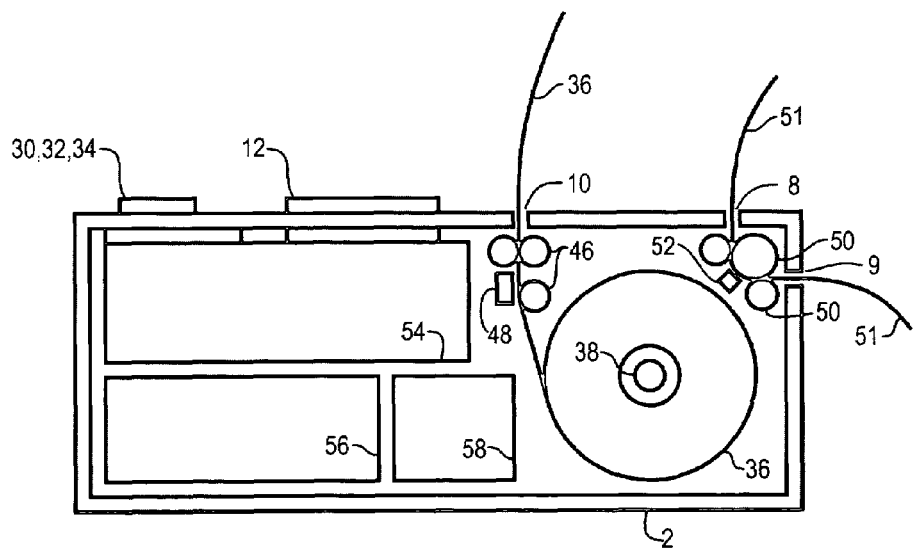
FIG. 2 is a section view of a cordless and wireless facsimile apparatus according to an illustrative embodiment of the present invention.

Reference is directed to FIG. 2, which is a section view of the cordless and wireless facsimile apparatus according to an illustrative embodiment of the present invention. The section view is cut through the housing 2 and reveals various internal components as well as the paper handling paths within the apparatus. The key actuators 30, 32, 34 are visible, as well as the display 12, which are disposed on the top of the housing 2. Within the housing, a package of electronics 54 is disposed beneath the user interface. A rechargeable storage battery 56 is provided to power the apparatus during portable operation. An access cover (not shown) is provided on the bottom of the housing to enable changing of the battery 56. The cordless and wireless telephone transceiver circuits 58 are also disposed within the housing 2. EMR shielding is provided around the transceivers 58 to reduce radio interference issues.

The paper handling paths are apparent in FIG. 2. In the illustrative embodiment, a roll of thermal paper 36 is supported within the housing 2 on a spindle 38. A set of drive rollers 46 transport the thermal paper 36 across a thermal print head 48, which is driven under control of the electronic circuits 54. The design and operation of thermal printers is known to those skilled in the art. As documents are printed, the thermal paper is ejected from the print slot 10 in the housing. As each page of a facsimile or copy is completed, the user tears the page along the edge of the slot 10. The paper scanning mechanism is also visible in FIG. 2. The original document 51 is fed into the paper input slot 8. A set of drive rollers 50 grip the document 51 and drive it past a scanner head 52. Document scanners are known to those skilled in the art. As the document 51 is driven by the drive rollers 50, it is ejected from an exit slot 9 at the back of the housing.

Figure 3:
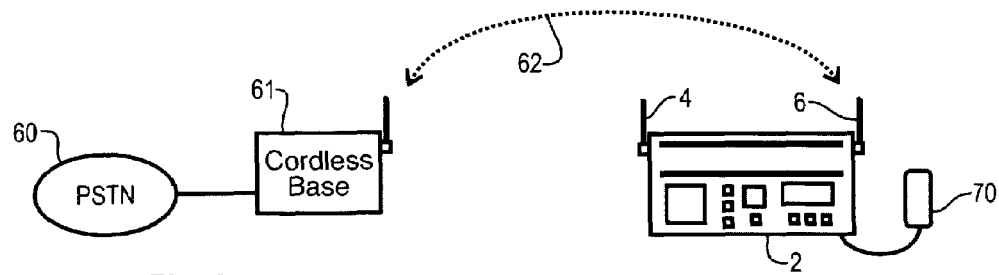
FIG. 3 is a system diagram of an illustrative embodiment of the present invention.

Reference is directed to FIG. 3, which is a system diagram of an illustrative embodiment of the present invention. The apparatus 2 of the present invention functions as a cordless telephone facsimile terminal in FIG. 3. A typical application of this mode of operation would be where a user is at their home or office and wireline PSTN access is available, yet cordless portability is desired. A cordless telephone base unit 61 is coupled to the PSTN 60 via a conventional twisted pair metallic connection. The cordless base unit 61 may be any of those known to persons skilled in the art, including open protocol standards as well as proprietary systems and protocols utilized by particular manufacturers. This generalization respecting cordless telephone protocols is applicable to all the functional embodiments described herein. In FIG. 3, a single channel, single terminal cordless system is illustrated. Cordless radio signals 62 couple the cordless base unit 61 to the cordless antenna of the apparatus 2. The wireless antenna 4 is not used in this mode of operation. Facsimile messages are received and transmitted from the apparatus 2 to the PSTN 60 according to the CCITT G3 protocol, using the cordless base 61, the cordless antenna 6, and the cordless radio signals 62 as a communications channel. A corded handset 70 is coupled to the apparatus 2 so that the user can access voice communications through the cordless environment when desired.

Figure 4:
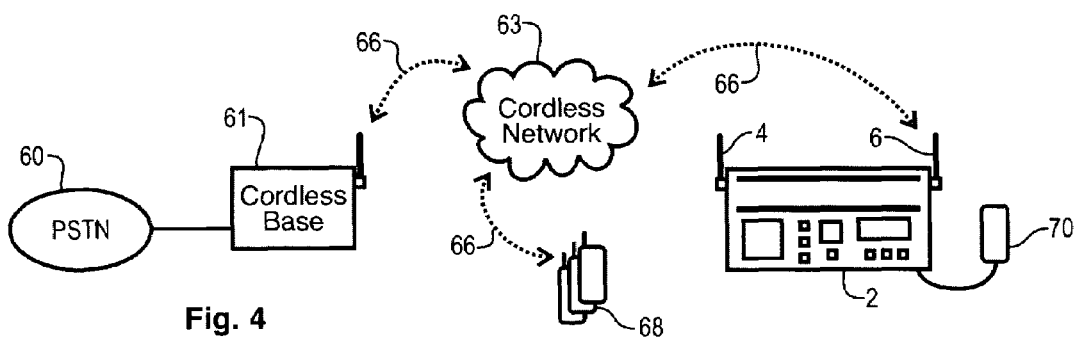
FIG. 4 is a system diagram of an illustrative embodiment of the present invention.

Reference is directed to FIG. 4, which is a system diagram of an illustrative embodiment of the present invention where that apparatus functions as a terminal unit in a multiple handset cordless telephone system. A cordless base unit 61 establishes a cordless telephone radio network 63 that supports multiple terminal units. The cordless base unit 61 is coupled to the PSTN 60 via a conventional twisted pair metallic connection. Plural cordless telephone handsets 68 communicate using cordless radio signals 66 into the cordless network 63. The plural handsets 68 can communicate amongst each other or into the PSTN 60. The apparatus 2 of the present invention functions as a single cordless terminal in the multiple terminal cordless network 63, which communicates via cordless radio signals 66 through the cordless antenna 6. The wireless antenna 4 is not used in this mode of operation. Facsimile messages are received and transmitted from the apparatus 2 to the PSTN 60 according to the CCITT G3 protocol, using the cordless base 61, the cordless network 63, the cordless antenna 6, and the cordless radio signals 66 as a communications channel. A corded handset 70 is coupled to the apparatus 2 so that the user can access voice communications through the cordless network 63 when one of the plural handsets 68 isn't otherwise available.

Figure 5:
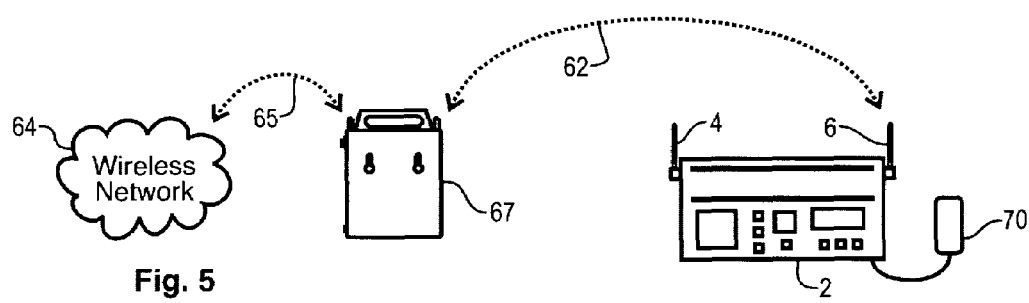
FIG. 5 is a system diagram of an illustrative embodiment of the present invention.

Reference is directed to FIG. 5, which is a system diagram of an illustrative embodiment of the present invention where the apparatus 2 functions as a cordless terminal in cooperation with a wireless and cordless node 67. The wireless and cordless node is the device described in co-pending U.S. patent application Ser. No. 10/781,105 to Liu, the inventor of the present invention, for WIRELESS NODE MULTIPLE HANDSET CORDLESS TELEPHONE SYSTEM. The wireless node 67 communicates wireless telephone signals 65 with a wireless telephone network 64, which are the telephone resource available to the apparatus 2 of the present invention. The wireless node 67 communicates cordless telephone signals 62 through the cordless antenna 6 of the apparatus 2. The wireless antenna 4 is not used in this mode of operation. Facsimile messages are received and transmitted from the apparatus 2 to the wireless network 64 according to the CCITT G3 protocol, using the wireless node 67, the cordless radio signals 62, and the cordless antenna 6 as a communications channel. A corded handset 70 is coupled to the apparatus 2 so that the user can access voice communications through to the wireless network 64 when desired.

Figure 6:
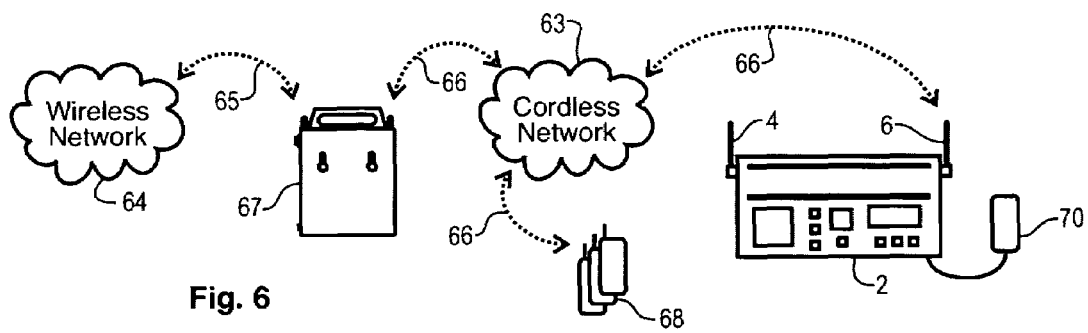
FIG. 6 is a system diagram of an illustrative embodiment of the present invention.

Reference is directed to FIG. 6, which is a system diagram of an illustrative embodiment of the present invention where the apparatus 2 functions as a cordless terminal in cooperation with a wireless and cordless node 67. The wireless and cordless node is the device described in co-pending U.S. patent application Ser. No. 10/781,105 to Liu, the inventor of the present invention, for WIRELESS NODE MULTIPLE HANDSET CORDLESS TELEPHONE SYSTEM. The wireless node 67 communicates wireless telephone signals 65 with a wireless telephone network 64, which are the telephone resource available to the apparatus 2 of the present invention. The wireless node 67 establishes a multiple terminal unit cordless telephone network 63. Plural cordless telephone handsets 68 communicate using cordless radio signals 66 into the cordless telephone network 63. The plural handsets 68 can communicate amongst each other or into the wireless telephone network 64. The apparatus 2 of the present invention functions as a single cordless terminal in the multiple terminal cordless network 63, which communicates via cordless radio signals 66 through the cordless antenna 6. The wireless antenna 4 is not used in this mode of operation. Facsimile messages are received and transmitted from the apparatus 2 to the wireless network 64 according to the CCITT G3 protocol, using the wireless node 67, the cordless radio network 63, and the cordless antenna 6 as a communications channel. A corded handset 70 is coupled to the apparatus 2 so that the user can access voice communications through to the wireless network 64 when desired.

Figure 7:
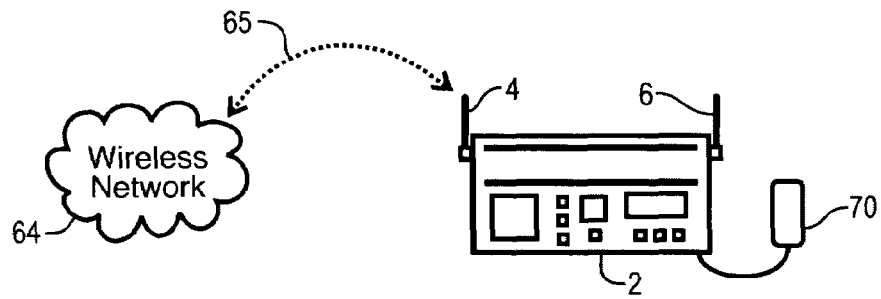
FIG. 7 is a system diagram of an illustrative embodiment of the present invention.

Reference is directed to FIG. 7, which is a system diagram of an illustrative embodiment of the present invention where the apparatus 2 functions as a stand-alone wireless telephone facsimile terminal unit. The apparatus 2 communicates using wireless telephone signals 65 through its wireless antenna 4 with a wireless telephone network 64. The cordless antenna 6 is not used in this mode of operation. Facsimile messages are received and transmitted from the apparatus 2 to the wireless network 64 according to the CCITT G3 protocol, using the wireless telephone signals and the wireless antenna 4 as a communications channel. A corded handset 70 is coupled to the apparatus 2 so that the user can access voice communications through to the wireless network 64 when desired.

Figure 8:
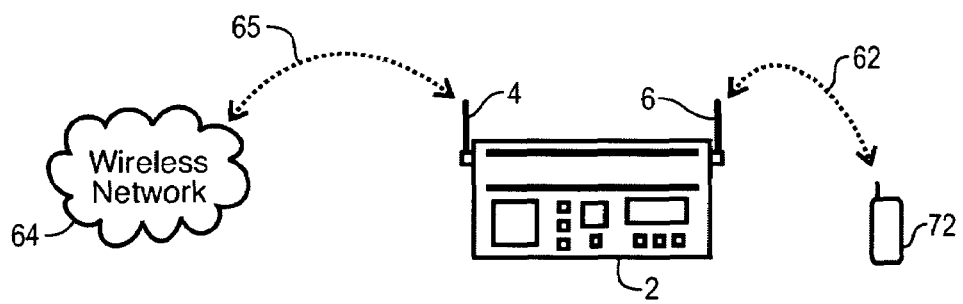
FIG. 8 is a system diagram of an illustrative embodiment of the present invention.

Reference is directed to FIG. 8, which is a system diagram of an illustrative embodiment of the present invention where the apparatus 2 functions as a wireless and cordless node in addition to a wireless facsimile machine. The apparatus 2 communicated wireless telephone signals 65 with a wireless telephone network 64 via wireless antenna 4. The wireless telephone network is the PSTN telephone resource in this embodiment. Facsimile messages are transmitted and received from the apparatus 2 to the wireless network 64 according to the CCITT G3 protocol, using the wireless telephone signals 65 as a communication channel. In this mode of operation, the apparatus 2 functions as a wireless and cordless node device as described in co-pending U.S. patent application Ser. No. 10/781,105 to Liu, the inventor of the present invention, for WIRELESS NODE MULTIPLE HANDSET CORDLESS TELEPHONE SYSTEM. A cordless telephone handset 72 communicates with the apparatus via cordless telephone signals 62 via cordless antenna 62.

Figure 9:
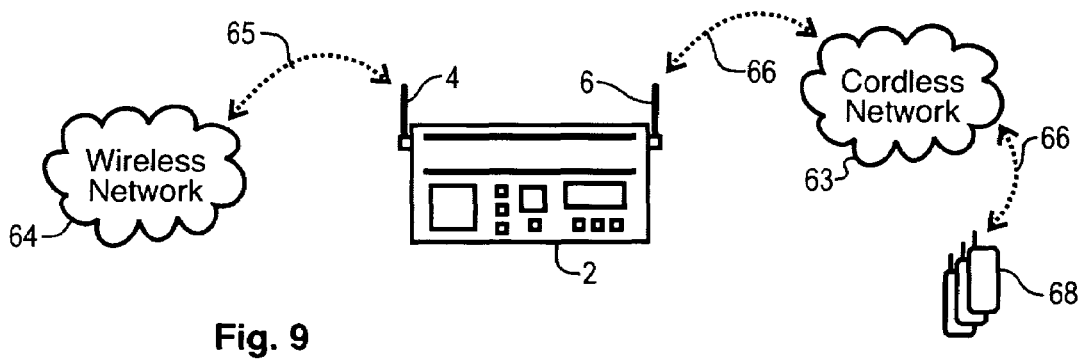
FIG. 9 is a system diagram of an illustrative embodiment of the present invention.

Reference is directed to FIG. 9, which is a system diagram of an illustrative embodiment of the present invention where the apparatus 2 functions as a multiple handset wireless and cordless node in addition to a wireless facsimile machine. The apparatus 2 communicated wireless telephone signals 65 with a wireless telephone network 64 via wireless antenna 4. The wireless telephone network is the PSTN telephone resource in this embodiment. Facsimile messages are transmitted and received from the apparatus 2 to the wireless network 64 according to the CCITT G3 protocol, using the wireless telephone signals 65 as a communication channel. In this mode of operation, the apparatus 2 functions as a multiple handset wireless and cordless node device as described in co-pending U.S. patent application Ser. No. 10/781,105 to Liu, the inventor of the present invention, for WIRELESS NODE MULTIPLE HANDSET CORDLESS TELEPHONE SYSTEM. The apparatus 2 sets up a cordless telephone network 63 using cordless telephone signals 66. Multiple cordless telephone handsets 68 communicate within the cordless telephone network, and can communicate amongst one another or into the wireless network 64 via the apparatus 2 using both the cordless antenna 6 and the wireless antenna 4.

Figure 10:
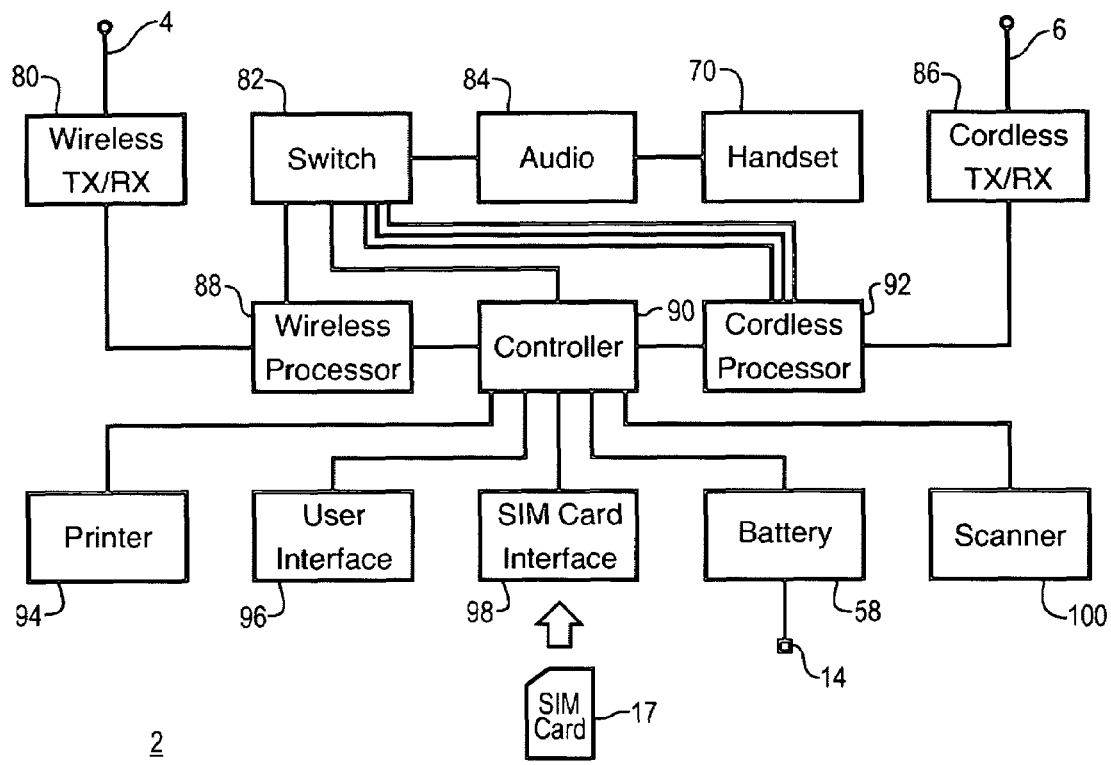
FIG. 10 is a functional block diagram of a cordless and wireless facsimile apparatus according to an illustrative embodiment of the present invention.

Reference is directed to FIG. 10, which is a functional block diagram of a cordless and wireless facsimile apparatus 2 according to an illustrative embodiment of the present invention. A wireless antenna 4 couples signals to and from a wireless transceiver 80. The wireless transceiver 80 modulates and demodulates encoded wireless telephone signals to the base-band. A wireless processor 88 converts the base-band signals to a wireless audio signal portion and a wireless control signal portion. The signals are duplex signals. These portions may be analog or digital depending on the radio technology employed, which may be any of those known to people skilled in the art. The wireless control signals are coupled to a controller 90. On the cordless side of the apparatus 2, a cordless telephone signal antenna 6 couples cordless telephone radio signals to a cordless transceiver 86. The cordless transceiver 86 modulates and demodulates the encoded cordless signals to the base-band. A cordless processor 92 converts the cordless signals to plural cordless audio signals and cordless control signals. In the case of a single channel cordless implementation of the present invention, then there is a single connection between the cordless processor 92 and the switch 82. The signals are duplex signals. The cordless control signals are coupled to the controller 90. The controller 90 operates to provides functionality by execution of suitable source code that is programmed into a memory portion of the controller 90. Control signals to and from both the wireless processor 88 and the cordless processor 92 enable the call progress functions of the apparatus 2. Those skilled in the art will appreciate that any of a variety of processors, microprocessors, controllers, microcontrollers, ASICs (application specific integrated circuits), signal processors, or other programmable devices may be used to embody the wireless processor 88, controller 90 and cordless processor 92. In fact a single such device may embody all three, or discrete devices may be used for each, and so forth.

The wireless audio signals and the plural cordless audio signals are coupled to switch 82, which serves to cross connect any two of these signals upon command of the controller 90. The technology utilized in the switch 82 will depend on the nature of the audio signals, which are controlled by the protocol and technology of the transceivers. Analog signals lend themselves to circuit switching, while data signals lend themselves to multiplexed switching. A telecommunications cross-point switching device may be used, or a digital switching device. In fact, the controller 90 can be used as the switch 82 in certain applications. Those skilled in the art are familiar with various technologies suitable for implementing the switch 82. In operation, as voice calls are processed, the controller 90 directs the switch 82 to couple calls from the wireless side to the cordless side or from different audio signals on the cordless side depending on the nature of the call. In the case where a corded handset 70 is in use, then the switch 82 couples the duplex audio to an audio circuit 84, which is coupled to the handset 70. The audio circuit 84 adjusts signal levels and impedances to match the handset 70 requirements. Call switching is at the control of controller 90, which operates in accordance with the aforementioned object code and user selections through the user interface 96.

The facsimile machine functions of the apparatus 2 are implemented using a page scanner 100 and a thermal printer 94, both of which are coupled to the controller 90. Various scanner and printer technologies known to those skilled in the art can be applied to the teachings of the present invention. The two principle characteristics preferred are compact size and low power consumption for battery operation. The modem functions required in the CCITT G3 protocol convert the modulated tones and signals through the analog audio channel into digital data. These modulation and demodulation functions are carried out in the wireless processor 88 or cordless processor 92 depending on the channel in use for facsimile transmission in each given facsimile call. In the illustrative embodiment, these functions are implemented as digital signal processing code, so the same code can be executed in the both processors 88, 92. Inn an alternative embodiment, the modem functions are carried out in the controller 90, the choice of which is a design decision. Those skilled in the art are knowledgeable in the area of CCITT G3 modulation and demodulation coding schemes.

The user interface 96 is provided in accordance with the design described with respect to FIG. 1 herein. The components include contact closure actuators for user access, indicators and a display. The implementation of such a user interface is known to those skilled in the art. A storage battery 58 is coupled to provide power to the various circuits in apparatus 2. A battery charging terminal 14 is present to allow connection of an external power supply for charging the battery 58 or for directly powering the apparatus 2 and its various circuits. The apparatus 2 in FIG. 10 also includes a SIM card interface circuit 98 with a SIM card interface slot to accept a SIM card 17. The slot (not shown) accepts a discrete SIM card, and the interface 98 is coupled to transfer SIM card data with the controller 90 and wireless processor 88.

Figures 11, 12:
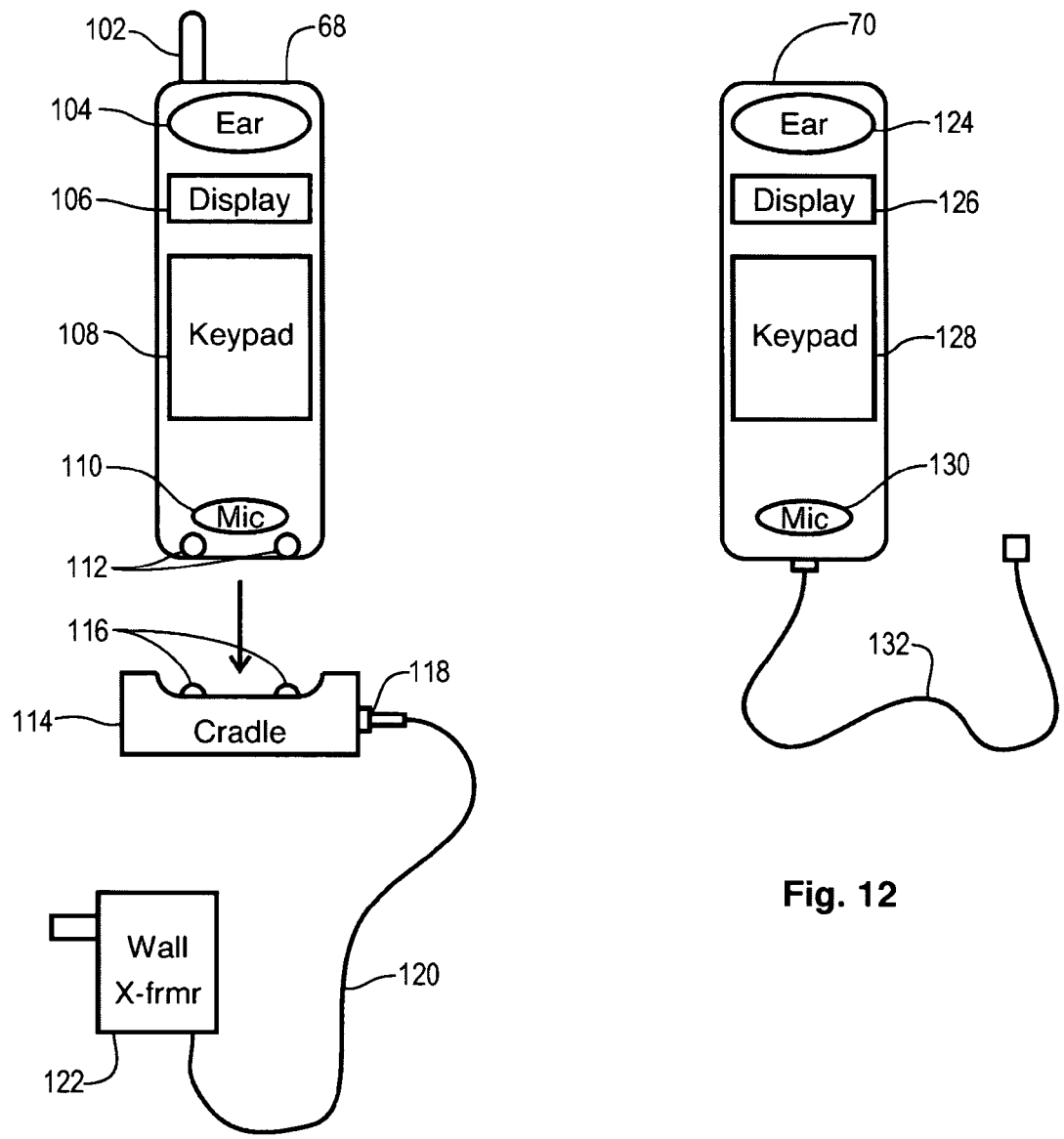
FIG. 11 is a diagram of a cordless telephone handset according to an illustrative embodiment of the present invention.
FIG. 12 is a diagram of a corded telephone handset according to an illustrative embodiment of the present invention.

Reference is directed to FIG. 11, which is a diagram of a cordless telephone handset 68 according to an illustrative embodiment of the present invention. The cordless handset 68 illustrated is suitable for use with the wireless and cordless facsimile apparatus of the present invention. The handset 68 includes a cordless antenna 102 that communicates cordless telephone radio signals with the cordless antenna on the facsimile apparatus (not shown). A earphone 104 is provided to couple audio signals to the user. A display 106 provides visual feedback to the user. A cordless telephone keypad 108 is provided, and is of the type known to those skilled in the art. A microphone 110 is used to couple user audio into the system. Battery charging contacts 112 couple with battery charging terminals 116 disposed on a charging cradle 114. The charging cradle 118 receives primary power though a connector 118 that couples with a cable 120 to a wall-plug transformer 122. The internal functions and circuitry of the cordless telephone 68 comply with the specifics of the cordless protocol implemented with the wireless and cordless facsimile apparatus of the present invention.

FIG. 12 is a diagram of a corded telephone handset 70 according to an illustrative embodiment of the present invention. The telephone handset 70 is suitable for corded connection to the wireless and cordless facsimile apparatus of the present invention. The handset includes the earphone 124 and microphone 130 that are typically employed in a telephone handset. In the illustrative embodiment, a data signal is coupled through the cord 132 in addition to the audio signals. The data signals are coupled to the controller in the apparatus of the present invention and enable the communications of data to the display 126 and telephone keypad 128 in the handset. This is a convenience feature, so the user can use the wireless and cordless facsimile apparatus of the present invention in the same manner as a voice telephone, when such service is desirable in addition to facsimile service.

Figure 13:
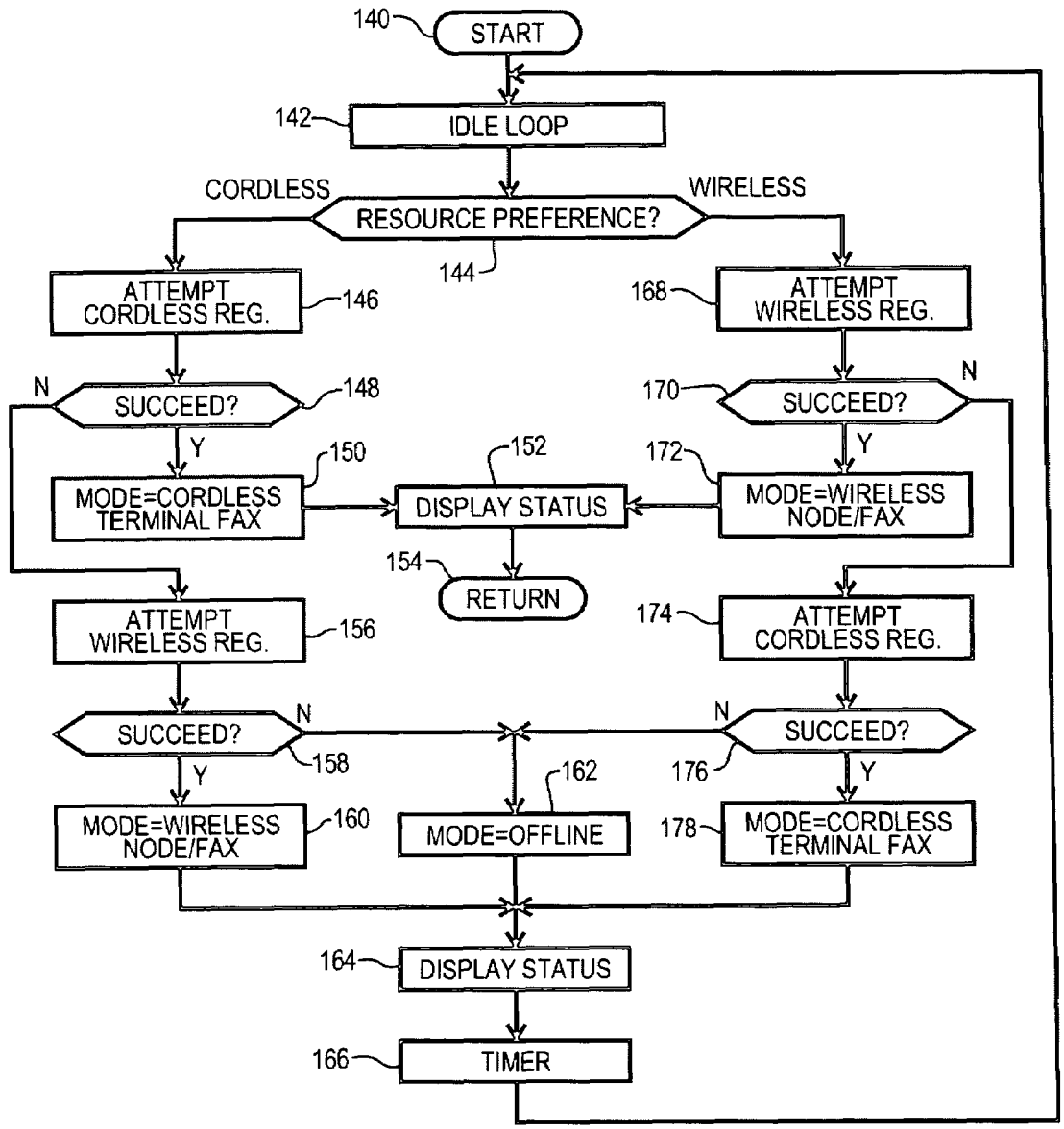
FIG. 13 is a process flow diagram according to an illustrative embodiment of the present invention.

Reference is directed to FIG. 13, which is a process flow diagram illustrating the telephone resource preference and selection processes according to an illustrative embodiment of the present invention. The process begins at step 140 and proceeds into an idle loop 142, from which all of the software processes flow. At step 144, at test is made to determine what resource preference has been specified. The specification of cordless or wireless resource can be by default programming or by a user specified preference. In the case the preference is set to "cordless", then the process is biased to access the cordless service for facsimile communications by proceeding to step 146. At step 146, the process attempts to register the apparatus with the available cordless resource, which may be a single or multiple handset cordless base of a wireless node. If the registration succeeds, then flow proceeds to step 150 where the mode of the apparatus is set to cordless facsimile mode. The cordless mode is displayed at step 152, such as by illuminating a cordless icon on the display, and flow returns to the idle loop at step 154. On the other hand, at step 148, if the cordless registration attempt fails, then flow proceeds to step 156. At step 156, the process attempts a wireless registration, since the cordless service is not presently available. If the wireless registration fails at step 158, then flow proceeds to step 162 where the mode is set to off-line, and, the status is displayed at step 164. On the other hand, at step 158, if the wireless registration has succeeded, then flow proceeds to step 160. At step 160, the mode is set to wireless node and facsimile terminal, and flow proceeds to step 164 where the status is displayed.

In FIG. 13 at step 144, if the resource preference is set to "wireless", then flow proceeds to step 168, where the wireless preference bias is implemented. At step 168, the apparatus attempts a wireless network registration. If the registration succeeds at step 170, then flow proceeds to step 152 where the status is displayed, such as by illuminating a wireless icon on the display. The process then returns to the idle state at step 154. On the other hand, at step 170, if the wireless registration attempt fails, then flow proceeds to step 174. At step 174, the process attempts a cordless registration, since the wireless service is not presently available. If the cordless registration fails at step 176, then flow proceeds to step 162 where the mode is set to off-line, and, the status is displayed at step 164. On the other hand, at step 176, if the cordless registration has succeeded, then flow proceeds to step 178. At step 178, the mode is set to cordless facsimile terminal, and flow proceeds to step 164 where the status is displayed. From step 164, regardless of how this step is reached, a timer is set at step 166. The purpose of the timer 166 is to cause the resource preference selection process to be re-executed at a later time, because the preferred resource was not available for registration. In a practical environment, the apparatus may move of the preferred resource may later become available. The timer 166 causes the process to be re-executed so that the preferred resource can later be accessed and set as the default mode.

Figure 14:
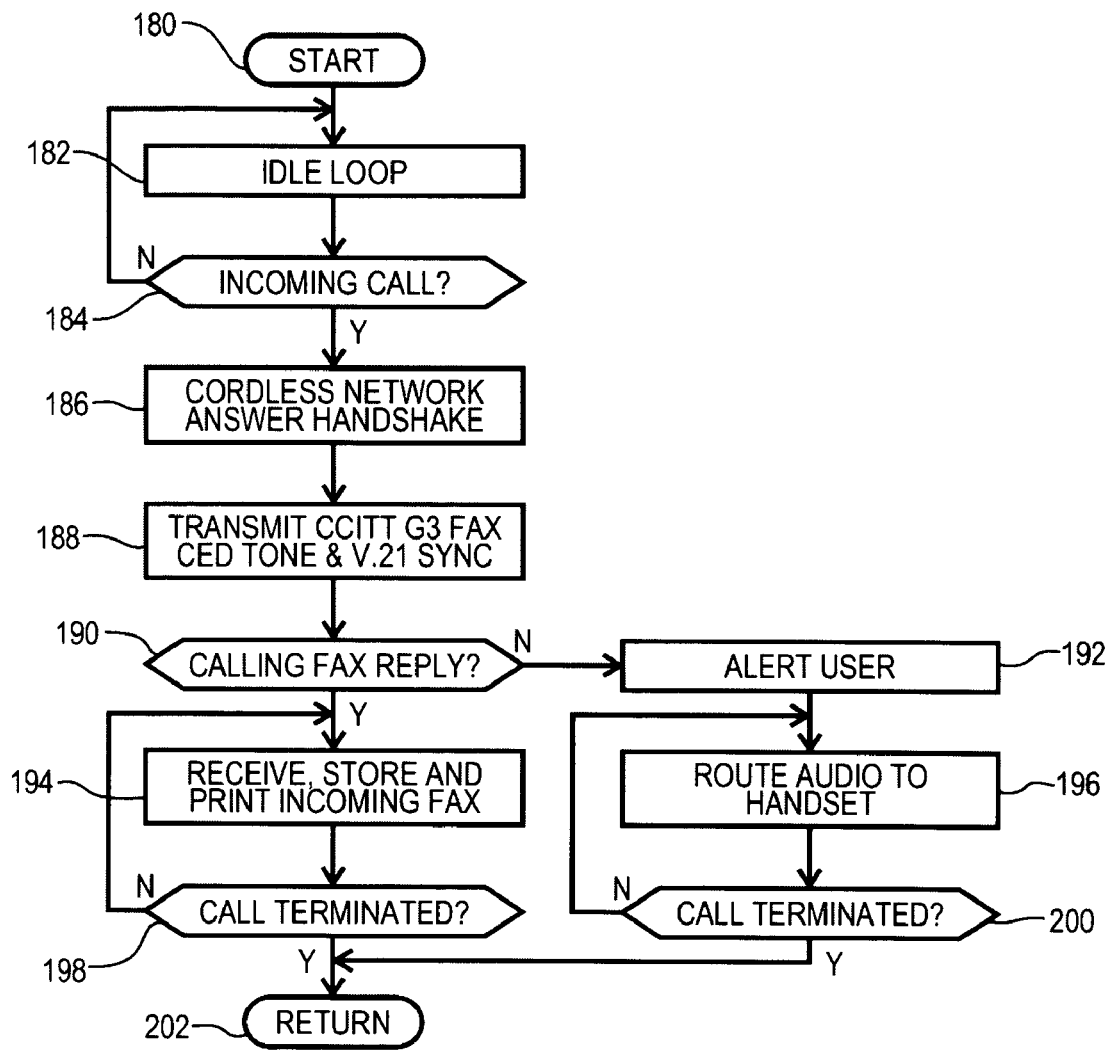
FIG. 14 is a process flow diagram according to an illustrative embodiment of the present invention.

Reference is directed to FIG. 14, which is a process flow diagram showing the cordless system incoming call processing according to an illustrative embodiment of the present invention. The process in FIG. 14 is entered when the resource is set to cordless and a call is received by the wireless and cordless apparatus of the present invention. The process starts at step 180 and proceeds to step 182, which is the aforementioned idle loop. At step 184, a test is mode to determine if a call is being received from the cordless system. If not, flow loops to step 182 and further waits for an incoming call. If a call is incoming at step 184, then flow proceeds to step 186. At step 186, a cordless system handshake is executed to answer and connect the incoming call. At step 186, the CCITT G3 CED tone and V.21 synchronization processes are executed. These processes are understood by those skilled in the art, as a proper answer sequence for and incoming facsimile message call. At step 190, a test is made to determine if the calling facsimile machine has properly replied under the CCITT G3 protocol. If not, then the call is not from a facsimile machine. Accordingly, flow proceeds to step 192 where the user is alerted that the call is a voice call and flow proceeds to step 196 where the audio is routed to the handset of the apparatus. A voice call is then in process. At step 200, a test is made to determine if the call has been terminated, such as be one of the telephones hanging up. If the call has not been terminated, then flow returns to step 196 and the call continues. If the call is terminated at step 200, then flow proceeds to step 202 where the apparatus returns to the idle state. On the other hand, at step 190, if the calling facsimile does respond according to the CCITT G3 signaling protocol then flow proceeds to step 194. At step 194, the facsimile message is received, stored and printed on a page-by-page basis. At step 198, a test is made to determine if the call is terminated. If not, flow returns to step 194 and further pages are received. If the call is terminated at step 198, then the apparatus returns to the idle state at step 202.

Figure 15:
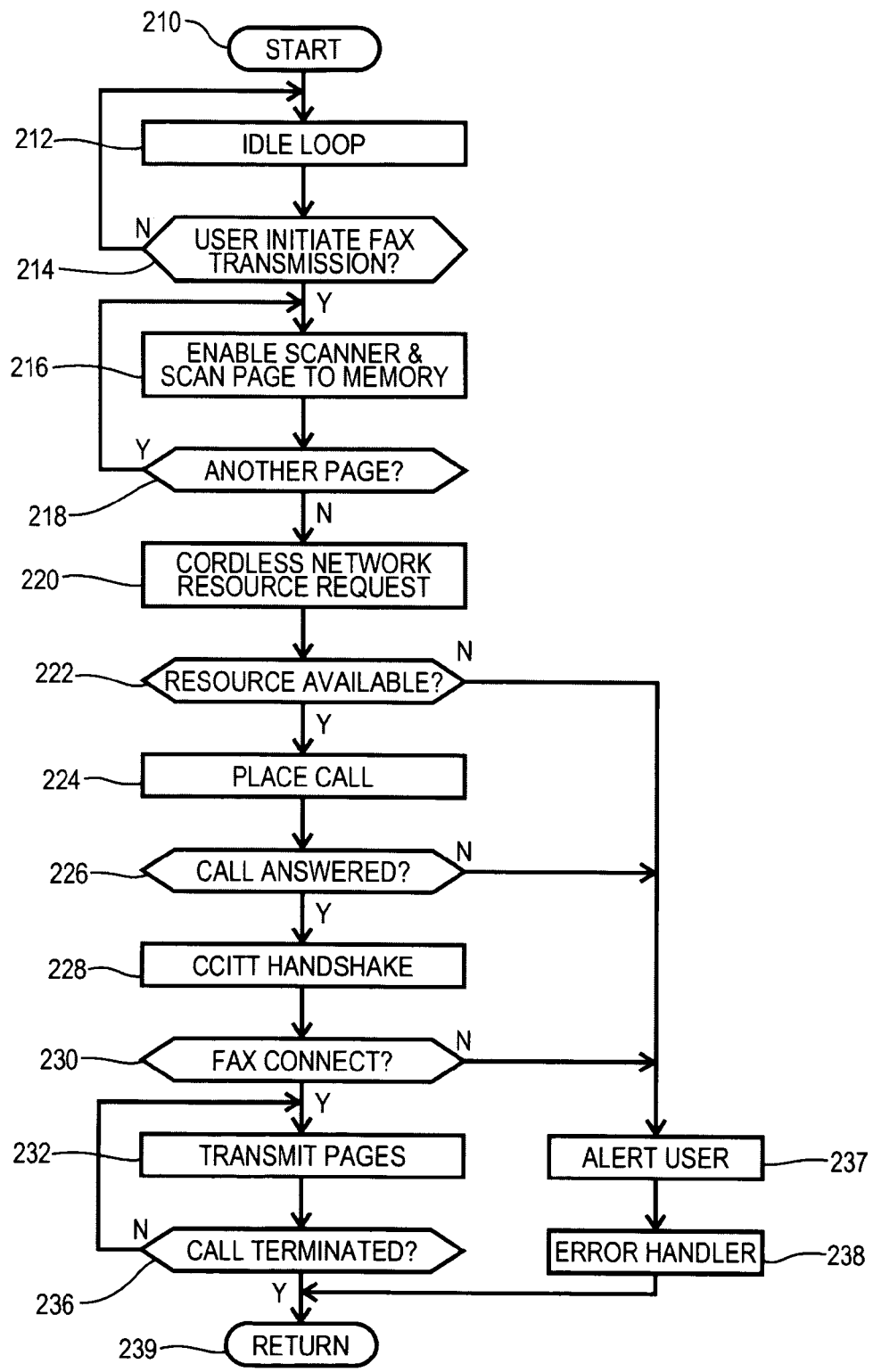
FIG. 15 is a process flow diagram according to an illustrative embodiment of the present invention.

Reference is directed to FIG. 15 is a process flow diagram of the cordless mode outgoing call process according to an illustrative embodiment of the present invention. The process begins at step 210 and proceeds to the aforementioned idle loop at step 212. At step 214 a test is made to determine if the user has initiated a facsimile transmission operation. If not, flow returns to the idle state at step 212. If the user has initiated a facsimile transmission operation at step 214, then flow proceeds to step 216. At step 216, the scanner is enabled and the currently loaded document page is scanned into memory for subsequent transmission. At step 218, a test is made to determine if another document page has been presented from transmission. If another page is ready, then flow returns to step 216 and that page is scanned to memory. On the other hand, at step 218, if there are no more document pages, then flow proceeds to step 220. At step 220, a call request is processed in the cordless system. If a cordless system resource is not available at step 222, then flow proceeds to step 237 where the user is alerted, and the error is suitable handled at step 238, such as setting a retry timer, etc. On the other hand, at step 222, if a cordless resource is available, then flow proceeds to step 224. At step 224, a call is placed to the predetermined destination telephone number. If the call is not answered at step 226, flow proceeds to steps 237 where the user is alerted and a suitable error handler processes the state at step 238. On the other hand, at step 226, if the call is answered, then flow proceeds to step 228. At step 228, the CCITT G3 handshake is executed with the answering facsimile machine. If the facsimile machines do not connect at step 230, then the user is alerted at step 237 and the error is handled at step 238. On the other hand, as step 230, if the facsimile machines do connect, then flow proceeds to step 232. At step 232, the document pages are transmitted to the receiving machine. At step 236, as test is made to determine if the call has been terminated. In not, flow returns to step 232 for continue transmitting pages. On the other hand, at step 236, if the call has been terminated then flow returns to the idle state at step 239.

Figure 16:
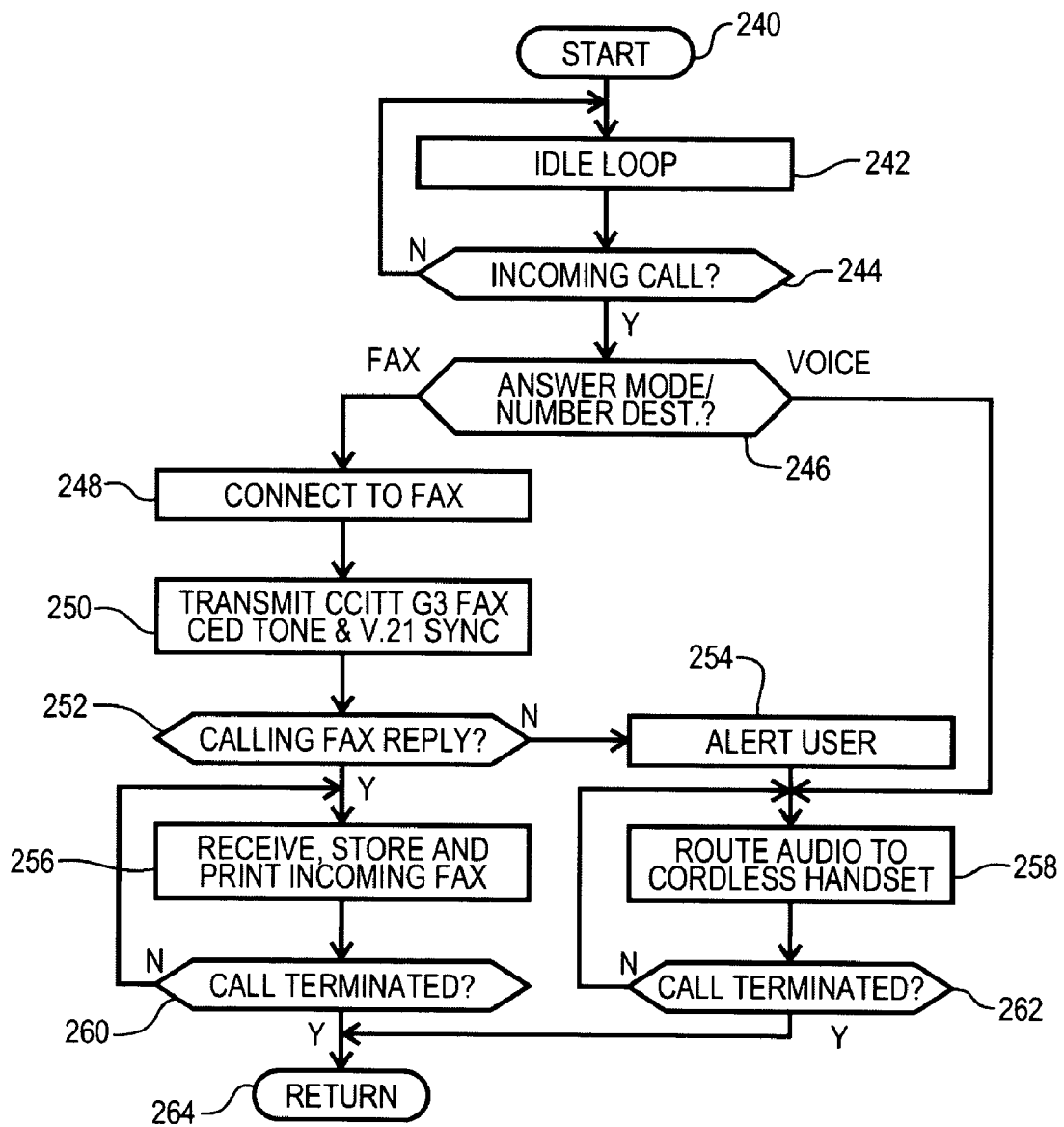
FIG. 16 is a process flow diagram according to an illustrative embodiment of the present invention.

Reference is directed to FIG. 16, which is a process flow diagram showing the wireless network incoming call processing according to an illustrative embodiment of the present invention. The process in FIG. 16 is entered when the resource is set to wireless and a call is received by the wireless and cordless apparatus of the present invention. The process starts at step 240 and proceeds to step 242, which is the aforementioned idle loop. At step 244, a test is mode to determine if a call is being received from the wireless network. If not, flow loops to step 242 and further waits for an incoming call. If a call is incoming at step 244, then flow proceeds to step 246. At step 246, the wireless network call is answered and a test is made to determine what the preferred answer mode of the apparatus is. The two options are facsimile answer or voice answer, based on the user's preference. If the preference is voice answer, then flow proceeds to step 258, which will be more fully discussed below. On the other hand, at step 246, if the answer mode preference is set to facsimile answer, then flow proceeds to step 248. At step 248, the call is coupled to the facsimile process in the apparatus. At step 250, the CCITT G3 CED tone and V.21 synchronization processes are executed. These processes are understood by those skilled in the art, as a proper answer sequence for and incoming facsimile message call. At step 252, a test is made to determine if the calling facsimile machine has properly replied under the CCITT G3 protocol. If not, then the call is not from a facsimile machine. Accordingly, flow proceeds to step 254 where the user is alerted that the call is a voice call and flow proceeds to step 258 where the audio is routed to the handset of the apparatus. A voice call is then in process. At step 262, a test is made to determine if the call has been terminated, such as be one of the telephones hanging up. If the call has not been terminated, then flow returns to step 258 and the call continues. If the call is terminated at step 262, then flow proceeds to step 264 where the apparatus returns to the idle state. On the other hand, at step 252, if the calling facsimile does respond according to the CCITT G3 signaling protocol then flow proceeds to step 256. At step 256, the facsimile message is received, stored and printed on a page-by-page basis. At step 260, a test is made to determine if the call is terminated. If not, flow returns to step 256 and further pages are received. If the call is terminated at step 260, then the apparatus returns to the idle state at step 264.

Figure 17:
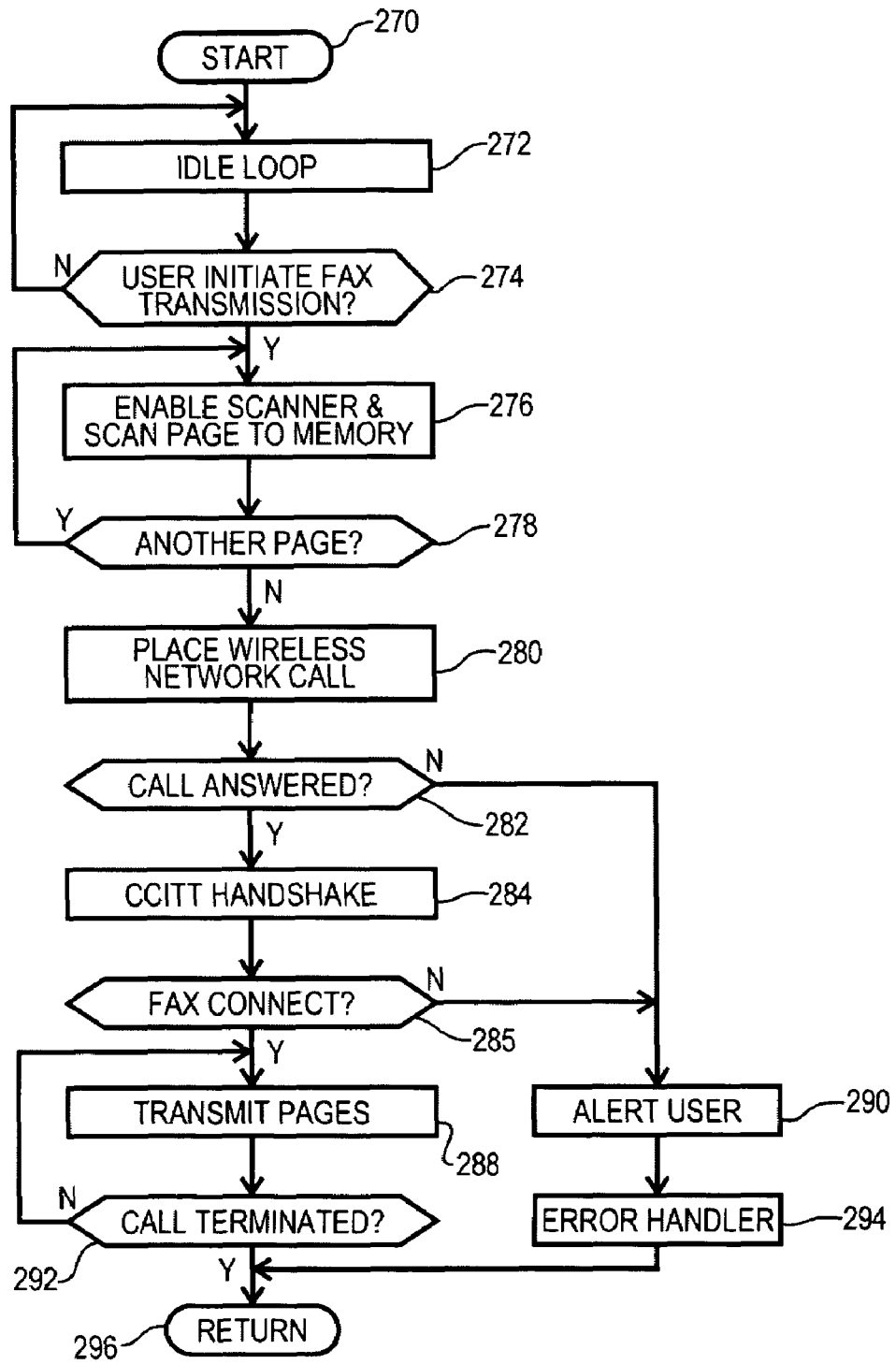
FIG. 17 is a process flow diagram according to an illustrative embodiment of the present invention.

Reference is directed to FIG. 17 is a process flow diagram of the wireless mode outgoing call process according to an illustrative embodiment of the present invention. The process begins at step 270 and proceeds to the aforementioned idle loop at step 272 At step 274 a test is made to determine if the user has initiated a facsimile transmission operation. If not, flow returns to the idle state at step 272. If the user has initiated a facsimile transmission operation at step 274, then flow proceeds to step 276. At step 276, the scanner is enabled and the currently loaded document page is scanned into memory for subsequent transmission. At step 278, a test is made to determine if another document page has been presented from transmission. If another page is ready, then flow returns to step 276 and that page is scanned to memory. On the other hand, at step 278, if there are no more document pages, then flow proceeds to step 280. At step 280, a call is placed in the wireless network. At step 282, if the call is not answered, flow proceeds to steps 290 where the user is alerted and a suitable error handler processes the state at step 294. On the other hand, at step 282, if the call is answered, then flow proceeds to step 284. At step 284, the CCITT G3 handshake is executed with the answering facsimile machine. If the facsimile machines do not connect at step 285, then the user is alerted at step 290 and the error is handled at step 294. On the other hand, as step 285, if the facsimile machines do connect, then flow proceeds to step 288. At step 288, the document pages are transmitted to the receiving machine. At step 292, as test is made to determine if the call has been terminated. In not, flow returns to step 288 for continue transmitting pages. On the other hand, at step 292, if the call has been terminated then flow returns to the idle state at step 296.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An apparatus for communicating data, including facsimile data, via wireless telephone network signals and cordless telephone signals, comprising:
   a facsimile machine coupled to a switch;
   a wireless telephone transceiver operable to modulate and demodulate the wireless telephone network signals to and from baseband signals connected to said switch;
   a cordless telephone transceiver operable to modulate and demodulate the cordless telephone signals to and from baseband signals connected to said switch, and wherein
   said switch is selectable to a first state wherein the facsimile data is coupled between said wireless telephone transceiver baseband signals and said facsimile machine, and a second state wherein the facsimile data is coupled between said cordless telephone transceiver baseband signals and said facsimile machine, and a third state wherein the facsimile data is coupled between said wireless telephone transceiver baseband signals and said cordless telephone transceiver baseband signals, thereby establishing and interconnection therebetween.

2. The apparatus of claim 1, further adapted to operate from a rechargeable battery, further comprising:
   a portable housing enclosing the apparatus, and
   a rechargeable battery receptacle formed within said housing for receiving the rechargeable battery.

3. The apparatus of claim 1 wherein said wireless telephone transceiver is adapted to communicate according to a wireless telephone network protocol.

4. The apparatus of claim 3 further adapted to receive a subscriber identity module containing user service profile data, the apparatus further comprising:
   a subscriber identity module interface coupled to said wireless telephone transceiver for receiving the subscriber interface module and communicating the user service profile data therewith.

5. The apparatus of claim 1 wherein said cordless telephone transceiver is adapted to communicate according to a cordless telephone protocol.

6. The apparatus of claim 1 wherein said cordless telephone transceiver is adapted to communicate according to a multiple-handset cordless telephone protocol.

7. The apparatus of claim 1, further comprising:
   a corded handset coupled to said switch, and wherein
   said switch is selectable to a fourth state wherein the data is coupled between said corded handset and said wireless telephone transceiver or said cordless telephone transceiver.

8. The apparatus of claim 1 wherein the wireless telephone network signals and cordless telephone signals are communicated through a wireless telephone network and a cordless telephone system, respectively, and the wireless telephone network and cordless telephone system require registration of the apparatus, further comprising:
   a controller coupled to said wireless telephone transceiver, said cordless telephone transceiver, and said switch, said controller operable to automatically select a preferred one of said wireless telephone transceiver or said cordless telephone transceiver and attempt to register therewith, and upon successful registration therewith, setting said switch to the corresponding one of said three switch states.

9. The apparatus of claim 8, further comprising:
an actuator coupled to said controller, and wherein
actuation of said actuator selects said preferred one of said wireless telephone transceiver or said cordless telephone transceiver.

10. The apparatus of claim 8 wherein said controller is operable to automatically select the non-preferred one of said wireless telephone transceiver or said cordless telephone transceiver in response to a failed registration attempt to register with the preferred one of said wireless telephone transceiver or said cordless telephone transceiver.

11. The apparatus of claim 8 wherein said controller is operable to periodically retry said attempt to register.

12. The apparatus of claim 1 wherein said switch is a digital switch.

13. The apparatus of claim 1 wherein said switch is an analog switch.

14. A method of communicating data, including facsimile data, via wireless telephone network signals and cordless telephone signals in an apparatus having a facsimile machine, a wireless telephone transceiver and a cordless telephone transceiver coupled through a switch, the method comprising the steps of:
coupling facsimile data between wireless telephone network baseband signals modulated and demodulated by the wireless telephone transceiver and the facsimile machine when the switch is set to a first state;
coupling facsimile data between cordless telephone baseband signals modulated and demodulated by the cordless telephone transceiver and the facsimile machine when the switch is set to a second state, and
coupling wireless telephone network baseband signals cordless telephone baseband signals between the wireless telephone transceiver and the cordless transceiver when the switch is set to a third state.

15. The method of claim 14, further comprising the step of communicating according to a wireless telephone network protocol by the wireless telephone transceiver.

16. The method of claim 15 further comprising the step of:
reading user service profile data from a subscriber identity module coupled to the wireless telephone transceiver.

17. The method of claim 14, further comprising the step of communicating according to a cordless telephone protocol by the cordless telephone transceiver.

18. The method of claim 14, further comprising the step of communicating according to a multiple-handset cordless telephone protocol by the cordless telephone transceiver.

19. The method of claim 14, wherein the apparatus further includes a corded handset coupled to the switch, and further comprising the step of:
coupling baseband signals through the switch, between the corded handset and the wireless telephone transceiver or the cordless telephone transceiver when the switch is set in a fourth state.

20. The method of claim 14, wherein the wireless telephone network system and the cordless telephone system require registration for service, the method further comprising the steps of:
communicating registration signals with a preferred one of the wireless telephone network or the cordless telephone system, and
upon successful completion of registration, setting the switch to the corresponding one of the three switch states.

21. The method of claim 20, further comprising the step of:
selecting said preferred one of said wireless telephone transceiver or said cordless telephone transceiver.

22. The method of claim 20, further comprising the step of:
selecting the non-preferred one of the wireless telephone transceiver or the cordless telephone transceiver in response to a failed registration attempt to register with the preferred one of the wireless telephone transceiver or the cordless telephone transceiver.

23. The method of claim 20, further comprising the step of:
periodically retrying said communicating registration signals step.

* * * * *